(12) United States Patent
Santillo et al.

(10) Patent No.: US 11,507,163 B2
(45) Date of Patent: Nov. 22, 2022

(54) RECONFIGURABLE POWER SEQUENCER FOR EMBEDDED SENSORS AND MIXED SIGNAL DEVICES

(71) Applicant: INVENSENSE, INC., San Jose, CA (US)

(72) Inventors: Giuseppe Santillo, Pavia (IT); Biswajit Datta, Fremont, CA (US)

(73) Assignee: INVENSENSE, INC., San Jose, CA (US)

( * ) Notice: Subject to any disclaimer, the term of this patent is extended or adjusted under 35 U.S.C. 154(b) by 239 days.

(21) Appl. No.: 17/033,461

(22) Filed: Sep. 25, 2020

(65) Prior Publication Data
US 2022/0100246 A1   Mar. 31, 2022

(51) Int. Cl.
*G06F 1/30* (2006.01)
*G06F 1/28* (2006.01)

(52) U.S. Cl.
CPC . *G06F 1/28* (2013.01); *G06F 1/30* (2013.01)

(58) Field of Classification Search
CPC ..................................... G06F 1/28; G06F 1/30
See application file for complete search history.

(56) References Cited

U.S. PATENT DOCUMENTS

| | | | | |
|---|---|---|---|---|
| 2006/0265617 | A1* | 11/2006 | Priborsky | G06F 1/3203 713/320 |
| 2011/0145604 | A1* | 6/2011 | Maciorowski | G06F 1/3203 713/300 |
| 2020/0133376 | A1* | 4/2020 | Yamamoto | H04N 21/4436 |

OTHER PUBLICATIONS

"Von Neumann architecture" Wikipedia, [https://en.wikipedia.org/wiki/Von_Neumann_architecture], retrieved Jul. 22, 2020, 12 pages.

\* cited by examiner

*Primary Examiner* — Mark A Connolly
(74) *Attorney, Agent, or Firm* — Amin, Turocy & Watson, LLP (57) ABSTRACT

Facilitating powering up/down respective analog circuits of mixed-signal devices utilizing a reconfigurable power sequencer component and corresponding reconfigurable sequencer processing unit(s) is presented herein. A system can comprise a mixed-signal component comprising a group of analog circuits comprising respective inputs to facilitate a power-up and a power-down of respective portions of the analog circuits; and a reconfigurable power sequencer component that obtains, from a reconfigurable memory of the system, reprogrammable information representing respective timed sequences of digital outputs electronically coupled to the respective inputs of the group of analog circuits, and based on the reprogrammable information, generates the respective timed sequences of the digital outputs to facilitate the power-up and the power-down of the respective portions of the analog circuits.

20 Claims, 12 Drawing Sheets

| Mnemonic | Machine level instruction | Operand | Description |
|---|---|---|---|
| TIM | 0x6 | Yes | Counts the number of clock cycles represented by the operand – it is an uninterruptible wait command. The minimum delay given by this instruction is of 1 clock cycle, therefore TIM 0 and TIM 1 instructions have the same effect. |
| DAT | 0x1 | Yes | Apply value in operand to LUT decoder output register |
| EOS | 0x2 | No | End of sequence command |
| | | Yes, two: | Moves content of second specified register into the first. Transfers can happen between the ALU A-register and the internal registers. |
| | | 1-bit + 8-bit | If bit[8] of the operand is '1', the data contained in the ALU register is moved to the internal register with address contained in bits from 7 to 0 of the operand. If bit[8] is '0', the content of the addressed internal register is moved to the ALU. |
| MOV | 0x3 | | IREG address map:<br>0x4: Input register<br>0x7: R0<br>0x8: R1 (if existent)<br>0x9: R2 (if existent)<br>... (if other R/registers are existent) |
| CLR | 0x4 | Yes | Clear interrupt flag – the argument is a binary vector, the position of the elements at '1' will be cleared in the event vector |
| JMP | 0x7 | Yes | Jump to address specified in operand |
| NOP | 0x5 | No | Do nothing instruction |
| IPT | N/A | Yes | Only for interrupt pointer table definition, the operand is the first address of the routine. IPT must be defined at beginning of assembly file. |
| CTM | 0x8 | No | Loads timer with value programmed in reg_tim_rst_val and counts the specified number of clock cycles. |
| WPS | 0x9 | Yes | Write value to SPU's Program Status Register |
| AND | 0xa | Yes, 8-bit | Performs bit-wise AND of register A and the specified immediate operand. Result is stored in A-register of ALU. |
| OR | 0xb | Yes, 8-bit | Performs bit-wise OR of register A and the specified immediate operand. Result is stored in A-register of ALU. |
| JZ | 0xc | Yes, 8-bit | Jump to specified address, when result of ALU operation is zero |
| JNZ | 0xd | Yes, 8-bit | Jump to specified address, when result of ALU operation is NOT zero |
| ADD | 0xe | Yes, 8-bit signed | Performs sum of register A and the specified immediate operand. Result is stored in A-register of ALU. |
| SUB | 0xf | Yes, 8-bit signed | Performs difference of register A and the specified immediate operand. Result is stored in A-register of ALU. |

FIG. 12

# RECONFIGURABLE POWER SEQUENCER FOR EMBEDDED SENSORS AND MIXED SIGNAL DEVICES

TECHNICAL FIELD

The subject disclosure generally relates to embodiments for a reconfigurable power sequencer for embedded sensors and mixed signal devices.

BACKGROUND

Conventional integrated circuit (IC) technologies utilize custom, specialized, etc. analog circuitry to perform signal conversion and conditioning within sensing, mixed- signal, etc. devices. In turn, unique power sequencers, e.g., comprising finite state machines (FSMs), are designed to correctly power up/down such analog circuitry according to a distinct number of digital signals and corresponding transition times. As a consequence, additional design and verification resources are used to design unique power sequencer circuits to accommodate for corresponding sensor, mixed signal, etc. design changes. In this regard, conventional IC technologies have had some drawbacks, some of which may be noted with reference to the various embodiments described herein below.

BRIEF DESCRIPTION OF THE DRAWINGS

Non-limiting embodiments of the subject disclosure are described with reference to the following figures, wherein like reference numerals refer to like parts throughout the various views unless otherwise specified:

FIG. 9 illustrates a block diagram of an instruction set for a reconfigurable power sequencer component, in accordance with various example embodiments;

DETAILED DESCRIPTION

Aspects of the subject disclosure will now be described more fully hereinafter with reference to the accompanying drawings in which example embodiments are shown. In the following description, for purposes of explanation, numerous specific details are set forth in order to provide a thorough understanding of the various embodiments. However, the subject disclosure may be embodied in many different forms and should not be construed as limited to the example embodiments set forth herein.

Conventional IC technologies utilize custom designed circuits to perform signal conversion and conditioning for analog circuits of mixed-signal, sensing, etc. devices—requiring additional design and verification resources to accommodate for each design iteration of the analog circuits. On the other hand, various embodiments disclosed herein can greatly reduce design and verification resources for mixed-signal devices by utilizing a reconfigurable power sequencer component and corresponding reconfigurable sequencer processing unit(s) to facilitate powering up/down respective analog circuit(s).

For example, a system, e.g., mixed signal system, micro-electro-mechanical system (MEMS) mixed signal device, etc. comprises: a mixed-signal component comprising a group of analog circuits comprising respective inputs to facilitate a power-up and a power-down of respective portions of the analog circuits; and a reconfigurable power sequencer component that obtains, from a reconfigurable, reprogrammable, etc. memory, e.g., LUT, of the system, reprogrammable information representing respective timed sequences of digital outputs electronically coupled to the respective inputs of the group of analog circuits, and based on the reprogrammable information, generates the respective timed sequences of the digital outputs to facilitate the power-up and the power-down of the respective portions of the analog circuits.

In an embodiment, a timed sequence of the respective timed sequences is represented by a set, vector, etc. representing an output value of the vector and a time interval for maintaining the output value.

In one embodiment, the group of analog circuits comprises a sensing device comprising an acoustic sensor, a microphone, an accelerometer, a gyroscope, a pressure sensor, a temperature sensor, a fingerprint sensor, or a magnetometer.

In another embodiment, the respective timed sequences of digital outputs comprise discrete-time quantized functions representing waveforms of the respective digital outputs to facilitate the power-up and the power-down of the respective portions of the analog circuits.

In yet another embodiment, the reprogrammable information comprises vectors that define respective values of the digital outputs, transitions of the respective values, and respective timings of the transitions.

In an embodiment, the reconfigurable power sequencer component comprises a group of reconfigurable sequencer processing units corresponding to respective analog circuits of the group of analog circuits.

In one embodiment, the a reconfigurable sequencer processing unit of the group of reconfigurable sequencer processing units comprises an LUT that stores a portion of the reprogrammable information representing another portion of the respective timed sequences of digital outputs electronically coupled to yet another portion of the respective inputs corresponding to an analog circuit of the group of analog circuits.

In another embodiment, the reconfigurable sequencer processing unit further comprises: an event decoder component that detects events represented by respective transitions of a group of interrupt inputs corresponding to interrupts that have been initiated via execution of instructions via the power sequencer component; and a control unit component that fetches, from the LUT via an interrupt vector table (IVT) in response to an event of the events represented by a transition of the respective transitions of an interrupt input of the group of interrupt inputs being detected, an instruction from the portion of the reprogrammable information. In this regard, the instruction represents an output vector of a timed sequence of the respective timed sequences corresponding to powering up the analog circuit or powering down the analog circuit—the timed sequence comprising a set of values representing the output vector and a time interval, period etc. for maintaining the output value.

Further, the control unit component generated, based on the instruction via an output register, a digital output of the digital outputs representing the timed sequence of the respective timed sequences to facilitate the powering up of the analog circuit or the powering down of the analog circuit.

In another embodiment, the system further comprises a lookup table generation component that obtains, from a file, file information representing the portion of the respective timed sequences of digital outputs, generates, using the file information, the portion of the reprogrammable information representing the portion of the respective timed sequences of digital outputs, and stores the portion of the reprogrammable information in the LUT.

In an embodiment, a method comprises: retrieving, by a system comprising a processing component, e.g., power sequencer component, reconfigurable digital vectors from a reconfigurable, reprogrammable, etc. memory, e.g., comprising a LUT, of the system—the reconfigurable digital vectors representing respective timed sequences of digital outputs of the system electronically coupled to a group of analog circuits of the system to facilitate powering up the group of analog circuits or powering down the group of analog circuits; and based on the reconfigurable digital vectors, generating, by the system, the timed sequences to facilitate the powering up of the group of the analog circuits or the powering down of the group of analog circuits.

In embodiment(s), each timed sequence of the respective timed sequences comprises a value of an output vector and a period of time for which to maintain the output value.

In one embodiment, the group of analog circuits comprises an acoustic sensor, a microphone, an accelerometer, a gyroscope, a pressure sensor, a temperature sensor, a fingerprint sensor, and/or a magnetometer.

In another embodiment, the reconfigurable digital vectors represent respective sequences of discrete-time quantized functions to facilitate the powering up of the group of analog circuits or the powering down of the group of analog circuits.

In yet another embodiment, the retrieving of the reconfigurable digital vectors comprises: generating an event in response to a transition of a group of interrupt inputs of the system being detected; and in response to the generating of the event, retrieving, from the memory via an IVT, a reconfigurable digital vector of the reconfigurable digital vectors corresponding to an analog circuit of the group of analog circuits.

In an embodiment, the reconfigurable digital vector represents a timed sequence of the respective timed sequences of a digital output of the digital outputs electronically coupled to the analog circuit—the timed sequence representing an output value of the digital output, a transition state of the digital output, and a timing value of the transition state representing a period during which the output value is to be maintained on the digital output.

In one embodiment, the generating of the respective timed sequences comprises generating, based on the output value, the transition state, and the timing value, the digital output to facilitate powering up of the analog circuit or powering down of the analog circuit.

In another embodiment, the method further comprises: obtaining information representing the respective timed sequences from a file, e.g., a Microsoft® Excel file, generating, by the system based on the information, the reconfigurable digital vectors; and storing, by the system, the reconfigurable digital vectors in the memory of the system.

In this regard, in an embodiment, the generating of the reconfigurable digital vectors comprises: generating, based on the information via a compiler, an assembly file; and generating, using the assembly file via an assembler, a hardware description language (HDL), e.g., Verilog, SystemVerilog, etc. output representing the reconfigurable digital vectors to be stored in the LUT.

In one embodiment, a sensor system comprises: a group of MEMS sensors that generate respective output signals based on respective external stimuli; and a power sequencer component that obtains, from a memory of the system, user-programmable timed sequences of digital signals electronically coupled to respective inputs of the group of MEMS sensors to facilitate control of power states of the group of MEMS sensors, and based on the user-programmable timed sequences, modifies, via the digital signals, the respective inputs of the group of MEMS sensors to facilitate the control of the power states of the group of MEMS sensors.

In another embodiment, the group of MEMS sensors comprises an acoustic sensor, a microphone, an accelerometer, a gyroscope, a pressure sensor, a temperature sensor, a fingerprint sensor, and/or a magnetometer.

In yet another embodiment, the user-programmable timed sequences comprise digital vectors representing respective output values of the digital signals, respective transition states of the digital signals, and timing values of the transition states representing respective periods during which the respective output values are to be maintained on the digital signals.

In an embodiment, the sensor system further comprises a LUT generation component that obtains information representing the digital vectors from a user-defined file, generates, e.g., via an HDL, the user-programmable timed sequences based on the information, and stores the user-programmable timed sequences in the memory.

In one embodiment, the power sequencer component comprises a von Neumann architecture for facilitating the control of the power states of the group of MEMS sensors.

As described above, conventional IC technologies have had some drawbacks with respect to requiring additional design and verification resources to accommodate for each design iteration of corresponding analog circuits. On the other hand, various embodiments disclosed herein can greatly reduce design and verification resources for mixed-signal devices by utilizing a reconfigurable power sequencer component to facilitate powering up/down analog circuit(s).

In this regard, and now referring to FIGS. 1-4, block diagrams of a mixed signal system (110) comprising a reconfigurable power sequencer component (120); a mixed signal system comprising a group of reconfigurable sequencer processing units (210) electronically coupled to respective analog circuits of a group of analog circuits (220); output vectors (310) that have been stored in a LUT and timed sequences (320) of digital outputs that have been generated, via the reconfigurable power sequencer component based on the output vectors; and a group of digital waveforms (400) that have been generated by the reconfigurable power sequencer component based on the output vectors are illustrated, respectively, in accordance with various example embodiments.

Figure 2:
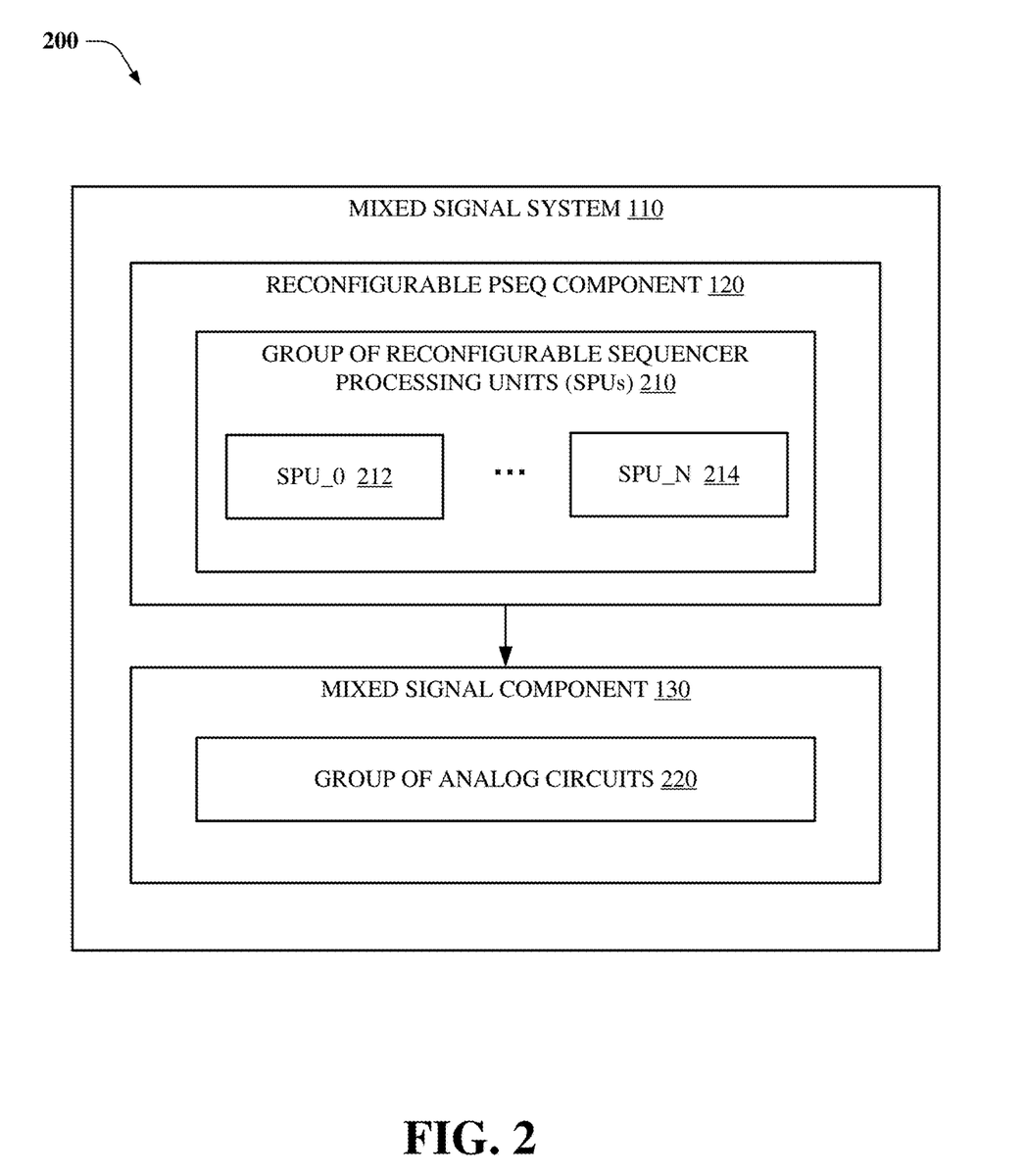
FIG. 2 illustrates a block diagram of a mixed signal system comprising a group of reconfigurable sequencer processing units (SPUs) electronically coupled to respective analog circuits of a group of analog circuits, in accordance with various example embodiments.

As illustrated by FIG. 2, in embodiment(s), the reconfigurable power sequencer component comprises a group of reconfigurable sequencer processing units (210) (e.g., comprising SPU_0 (212) to SPU_N (214)). Digital outputs of each sequencer processing unit are electrically coupled to respective inputs of a group of analog circuits (220) of a mixed signal component (130) of the mixed signal system to facilitate a power-up and a power-down of respective portions of the group of analog circuits.

In embodiment(s), the group of analog circuits comprises a sensing device comprising an acoustic sensor, a microphone, an accelerometer, a gyroscope, a pressure sensor, a temperature sensor, a fingerprint sensor, and/or a magnetometer.

Figure 1:
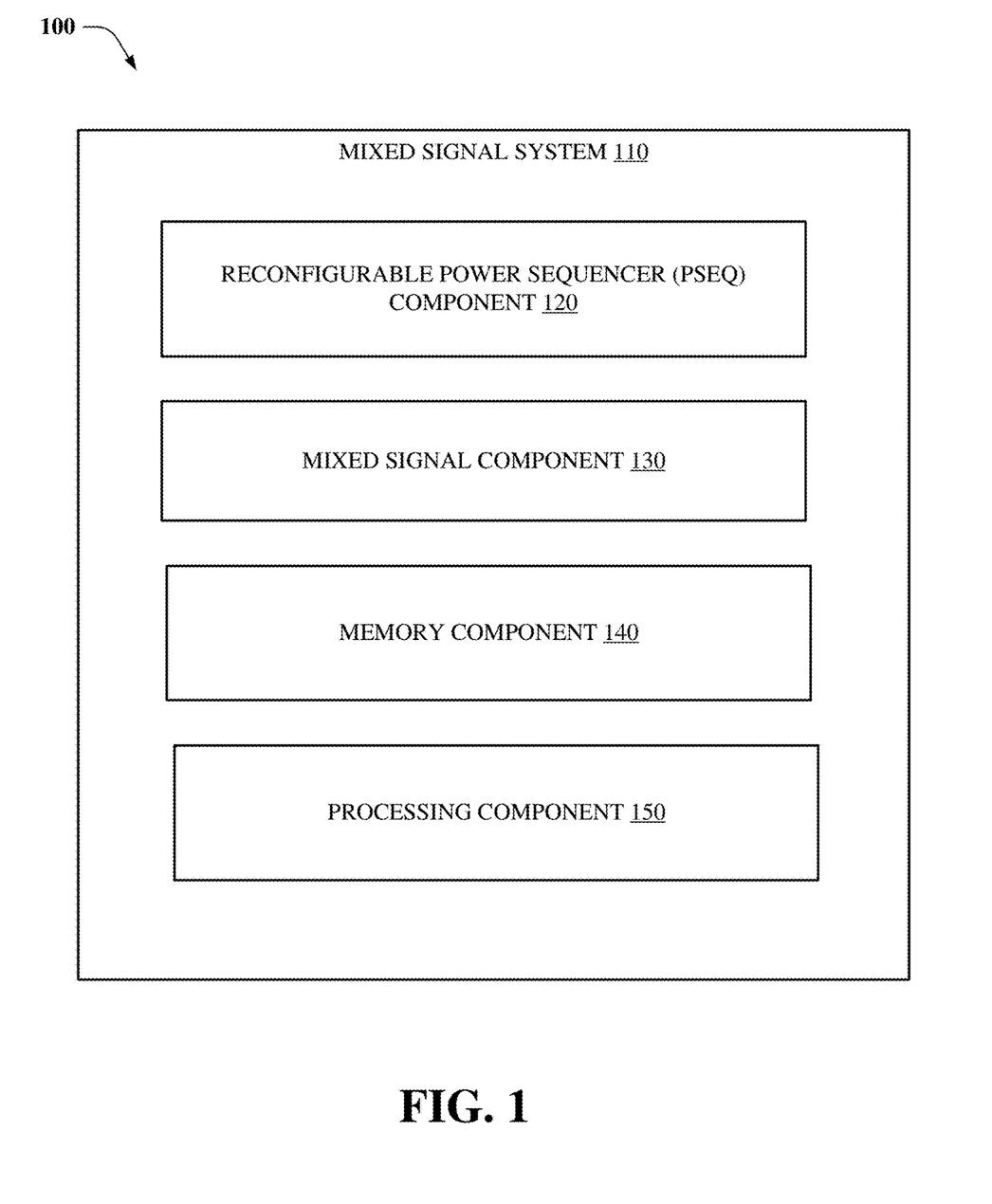
FIG. 1 illustrates a block diagram of a mixed signal system comprising a reconfigurable power sequencer (PSEQ) component, in accordance with various example embodiments.
Figure 3:
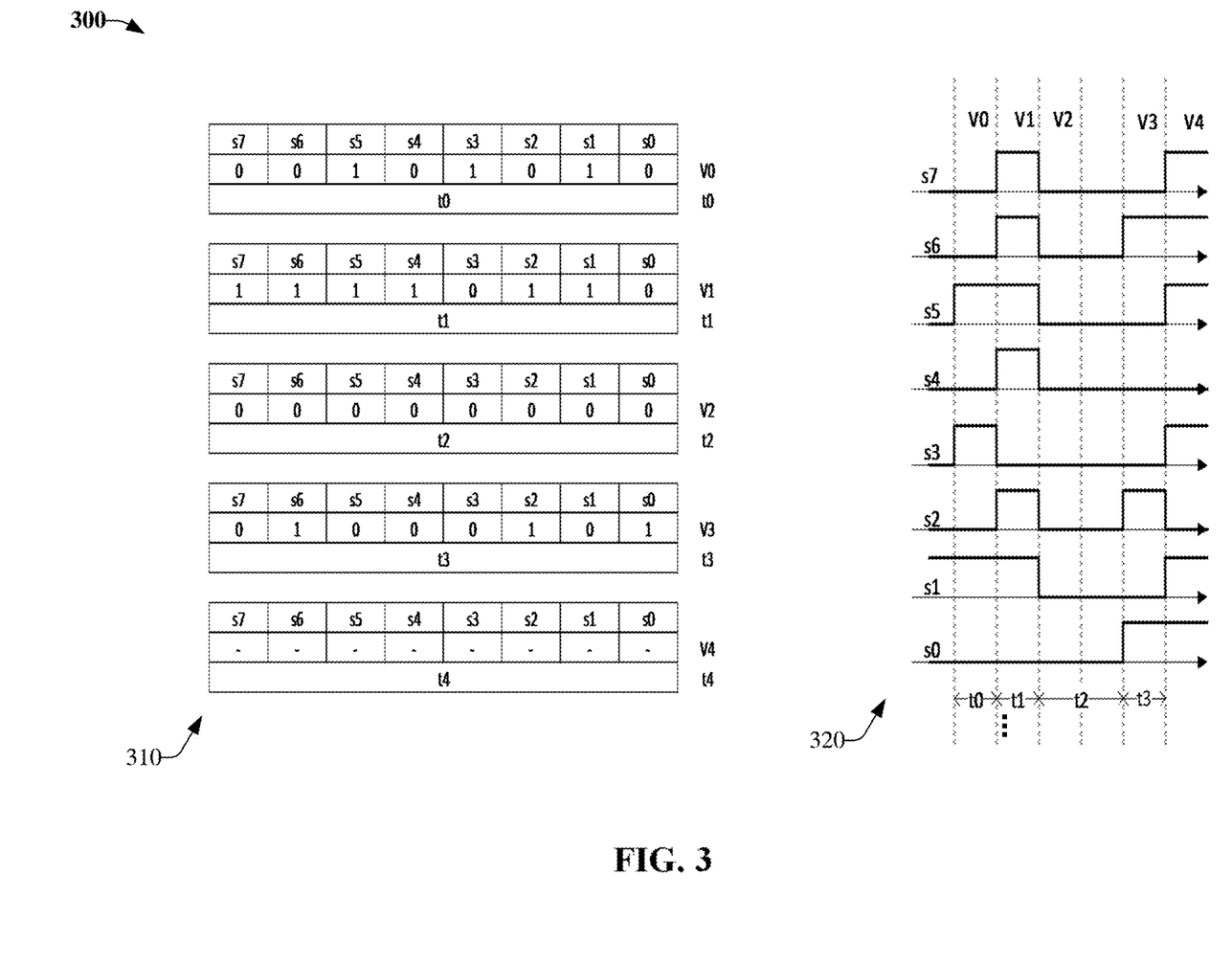
FIG. 3 illustrates a block diagram of output vectors that have been stored in a lookup table (LUT), and timed sequences of digital outputs that have been generated, via the reconfigurable power sequencer component, based on the output vectors, in accordance with various example embodiments.

The reconfigurable power sequencer component obtains, from a reconfigurable, reprogrammable, etc. memory, e.g., memory component (140), LUT, etc. reprogrammable information, e.g., output vectors (310), representing respective timed sequences (320) of digital outputs electronically coupled to the respective inputs of the group of analog circuits. Further, based on the output vectors, the power sequencer component generates the respective timed sequences of the digital outputs to facilitate the power-up and the power-down of the respective portions of the analog circuits.

In one embodiment, the respective timed sequences of digital outputs comprise discrete-time quantized functions representing waveforms of the respective digital outputs to facilitate the power-up and the power-down of the respective portions of the analog circuits.

Figure 4:
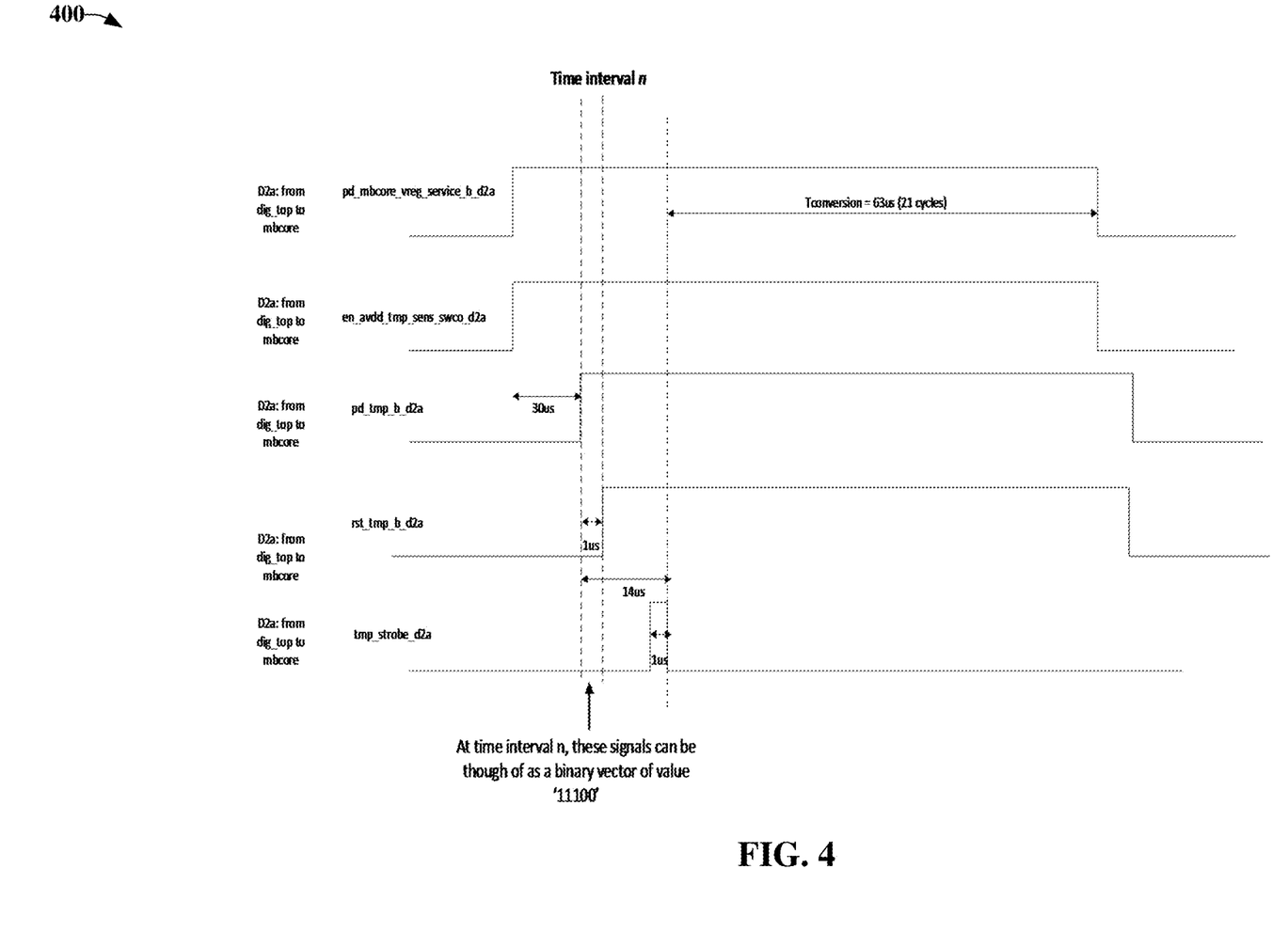
FIG. 4 illustrates a block diagram of group of digital waveforms that have been generated via the reconfigurable power sequencer component, in accordance with various example embodiments.

In embodiment(s) illustrated by FIG. 3, an output vector of the output vectors (V1, V2, V3, V4) is a set, vector, etc. comprising an output value (S7, S6, S5, S4, S3, S2, S1, S0) of the output vector and a time interval, period, etc. (t1, t2, t3, t4) for maintaining the output value. FIG. 4 illustrates a group of digital waveforms (400) representing digital outputs that have been generated by the reconfigurable power sequencer component based on other output vectors.

Figure 5:
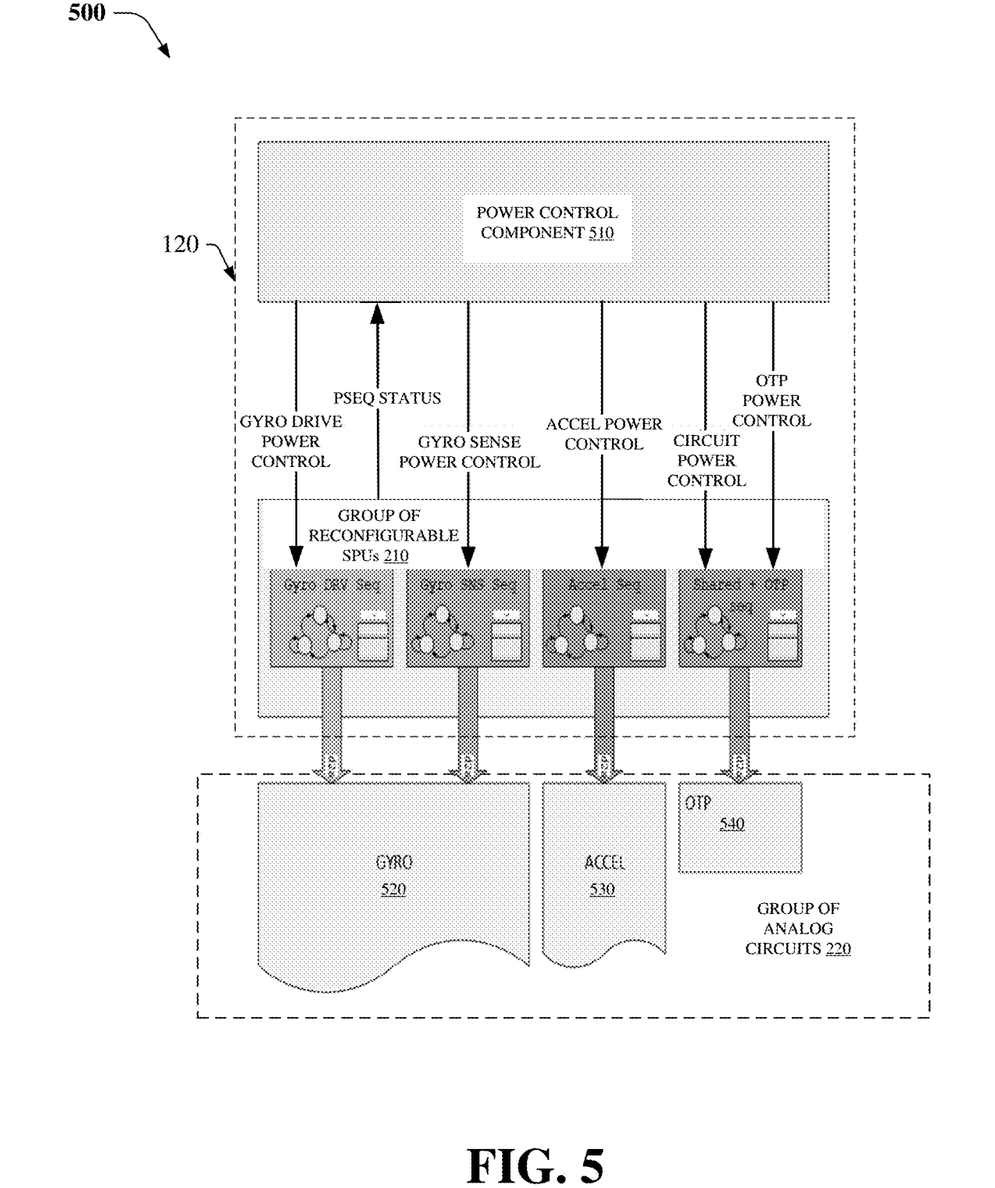
FIG. 5 illustrates a block diagram of a mixed signal system comprising reconfigurable sequencer processing units electronically coupled to a group of analog circuits comprising a gyroscope, an accelerometer, and a one-time programmable (OTP) circuit, in accordance with various example embodiments.

Now referring to FIG. 5, a block diagram of a sensor system (500) comprising a group of reconfigurable sequencer processing units (210) that is electronically coupled to a group of analog circuits (220) (e.g., a group of MEMS sensors, etc.) that generate respective output signals based on respective external stimuli, forces, etc. being applied to the group of analog circuits is illustrated, in accordance with various example embodiments. In this regard, in an embodiment, the group of analog circuits comprises a gyroscope (520), an accelerometer (530), and a one-time programmable (OTP) circuit (540). In other embodiment(s) (not shown), the group of analog circuits comprises an acoustic sensor, a microphone, a pressure sensor, a temperature sensor, a fingerprint sensor, a magnetometer, etc.

As illustrated by FIG. 5, the reconfigurable power sequencer component can comprise a power control component (510) that is electronically coupled, via power control signals (GYROSCOPE (GYRO) DRIVE POWER CONTROL, PSEQ STATUS, GYRO SENSE POWER CONTROL, ACCELEROMETER (ACCEL) POWER CONTROL, CIRCUIT POWER CONTROL, OTP POWER CONTROL), to the group of reconfigurable sequencer processing units. In this regard, the power control component can initiate, via the power control signals, the group of reconfigurable sequencer processing units to change respective power states of the group of analog circuits. Further, the power control component can receive, from the group of reconfigurable sequencer processing units, power control signals representing a status of the reconfigurable power sequencer component, respective sequencer processing units of the group of reconfigurable sequencer processing units, etc.

In this regard, based on the power control signals, respective sequencer processing units of the group of reconfigurable sequencer processing units can obtain, from memories, LUTs, etc. of the respective sequencer processing units, user-programmable timed sequences of digital signals electronically coupled to respective inputs of the group of analog circuits to facilitate control of the respective power states of the group of analog circuits. In turn, based on the user-programmable timed sequences, the respective sequencer processing units can modify, via the digital signals, the respective inputs of the group of analog circuits to facilitate the control of the power states of the group of analog circuits.

In an embodiment, the user-programmable timed sequences comprise digital vectors representing respective output values of the digital signals, respective transition states of the digital signals, and timing values of the transition states representing respective periods during which the respective output values are to be maintained on the digital signals.

Figure 6:
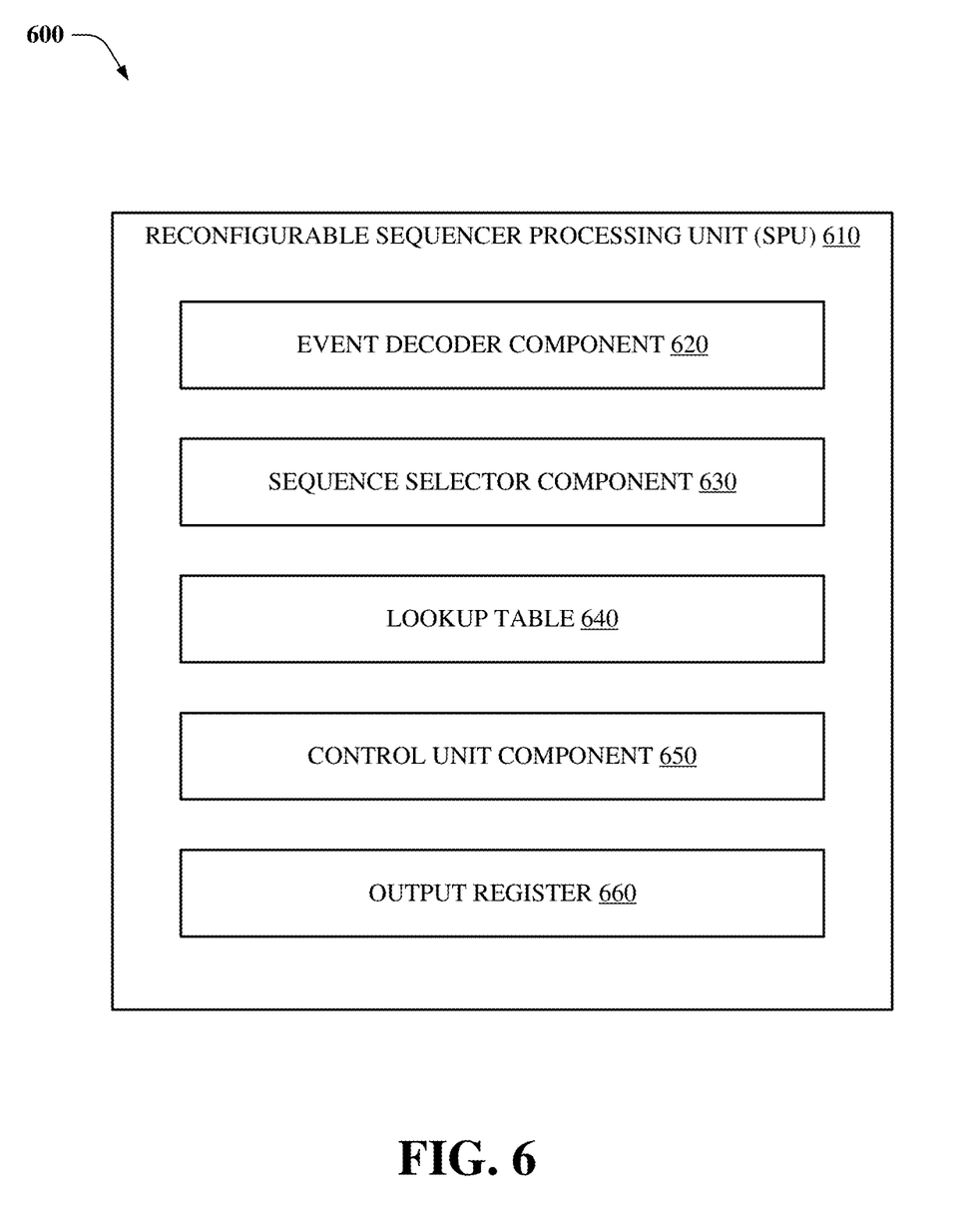
FIG. 6 illustrates a block diagram of a reconfigurable sequencer processing unit (SPU), in accordance with various example embodiments.
Figure 7:
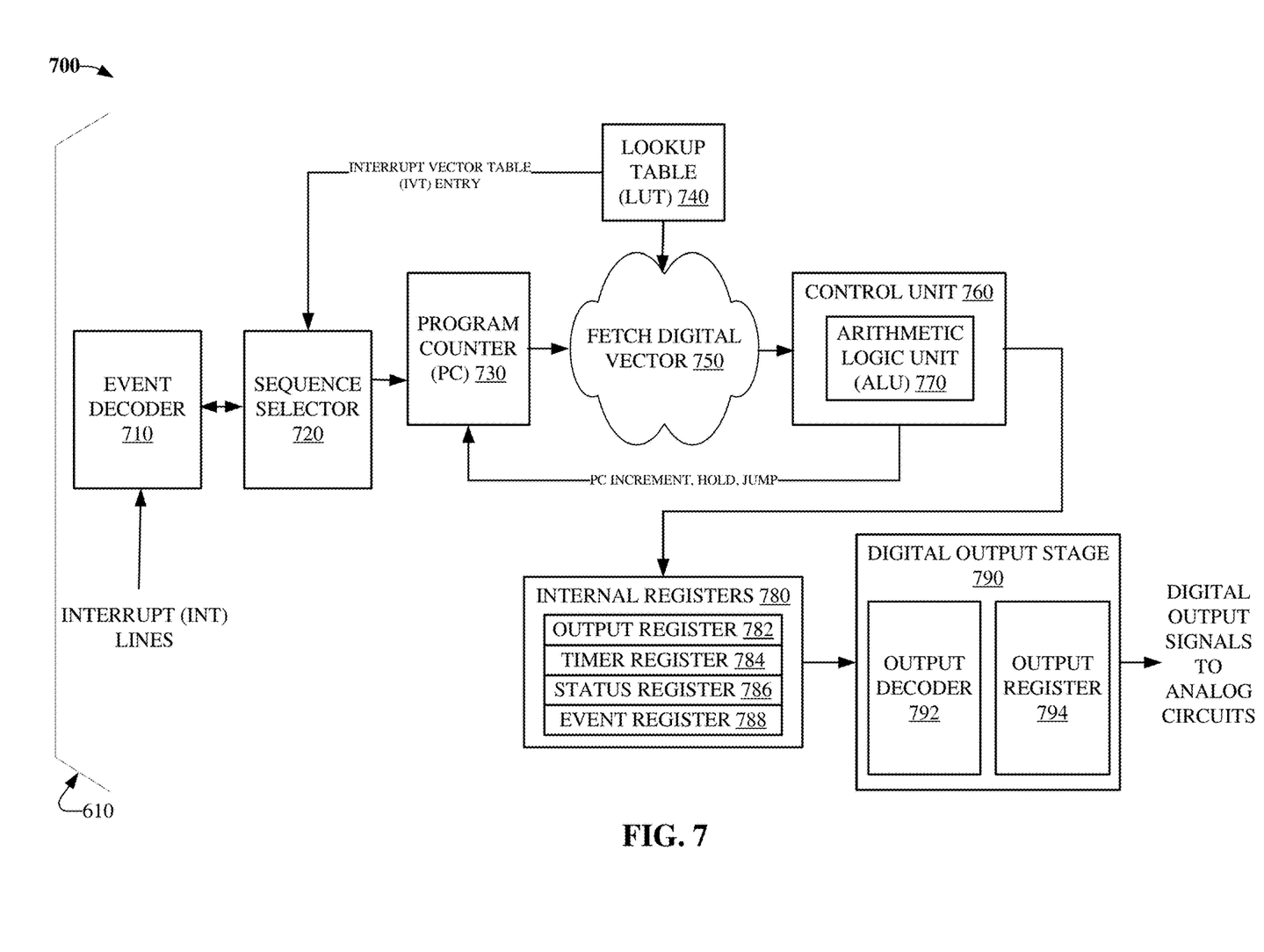
FIG. 7 illustrates a block diagram of another reconfigurable sequencer processing unit, in accordance with various example embodiments.

FIGS. 6 and 7 illustrates block diagrams of a reconfigurable sequencer processing unit (610), in accordance with various example embodiments. The reconfigurable sequencer processing unit comprises an event decoder component (620), a sequence selector component (630), a LUT (640), a control unit component (650), and an output register (660).

The event decoder component (e.g., event decoder 710) detects events represented by respective transitions of a group of interrupt (INT) lines, inputs, etc. corresponding to interrupts that have been initiated via execution of instructions via the power sequencer component.

The sequence selector component (e.g., sequence selector 720) enables the control unit component (e.g., control unit 760, arithmetic logic unit (ALU) 770, etc.) to fetch, via an IVT using a program counter (PC) (730), an instruction representing a digital vector (750) from the LUT (e.g., LUT 740) in response to an event of the events representing a transition of the respective transitions of the group of INT lines being detected. In this regard, the instruction represents a timed sequence of the user-programmable timed sequences corresponding to powering up the analog circuit or powering down the analog circuit.

Further, based on the instruction, the control unit component generates, via the output register (e.g., 794), a digital output of the digital outputs representing the timed sequence of the respective timed sequences to facilitate the powering up of the analog circuit or the powering down of the analog circuit.

In embodiments, the reconfigurable sequencer processing unit comprises a von Neumann architecture for facilitating the control of the power states of the analog circuit.

Figure 8:
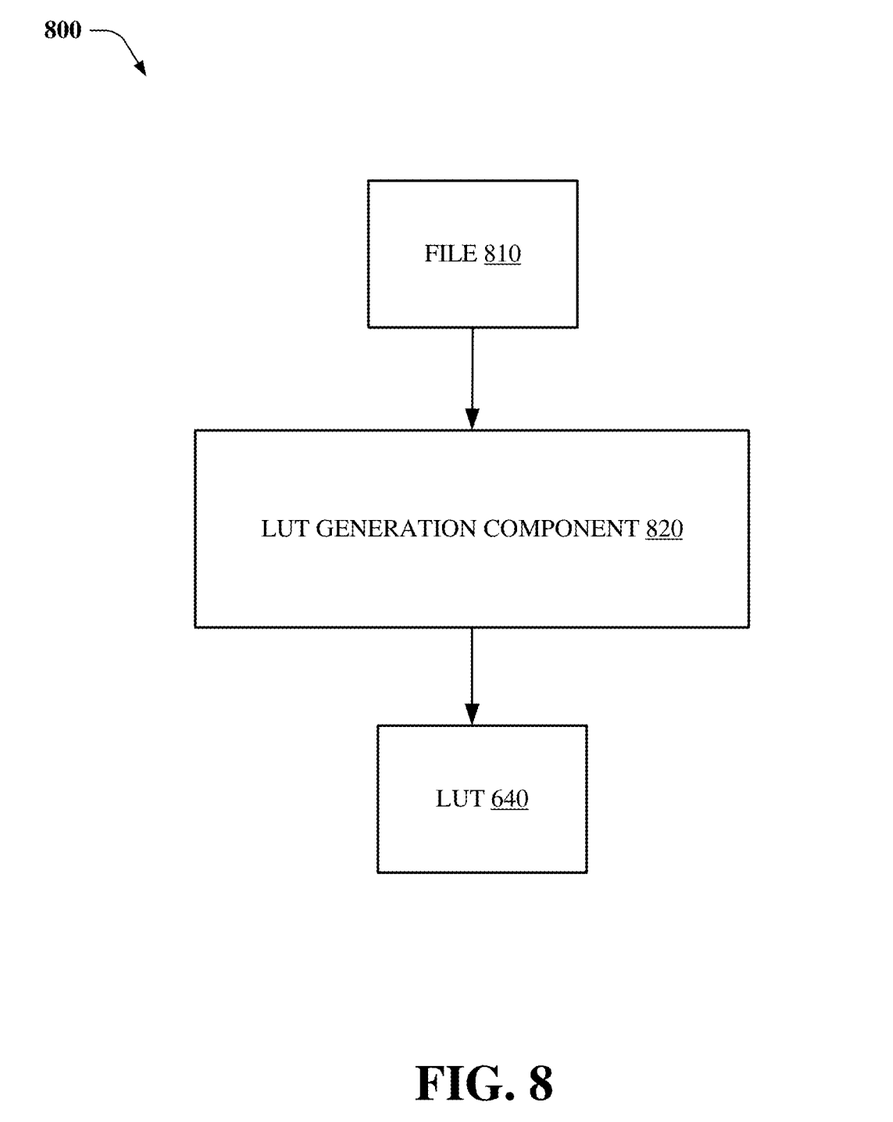
FIG. 8 illustrates a block diagram of a reconfigurable power sequencer environment comprising a lookup table generation component, in accordance with various example embodiments.

Now referring to FIG. 8, a block diagram of a reconfigurable power sequencer environment (800) comprising a LUT generation component (820) is illustrated, in accordance with various example embodiments.

The LUT generation component obtains information representing the digital vectors, reconfigurable digital vectors, etc. (e.g., representing the respective timed sequences) from a user-defined file (810), e.g., a Microsoft® Excel file. Further, the LUT generation component generates, based on the information, the digital vectors, reconfigurable digital vectors, etc.

In this regard, in an embodiment, the LUT generation component generates the digital vectors by generating, via a compiler, an assembly file. In turn, the LUT generation component generates, using the assembly file via an assembler, a hardware description language (HDL), e.g., Verilog, SystemVerilog, etc. an output representing the digital vectors. In turn, the LUT generation component stores the digital vectors in the LUT.

Figure 10:
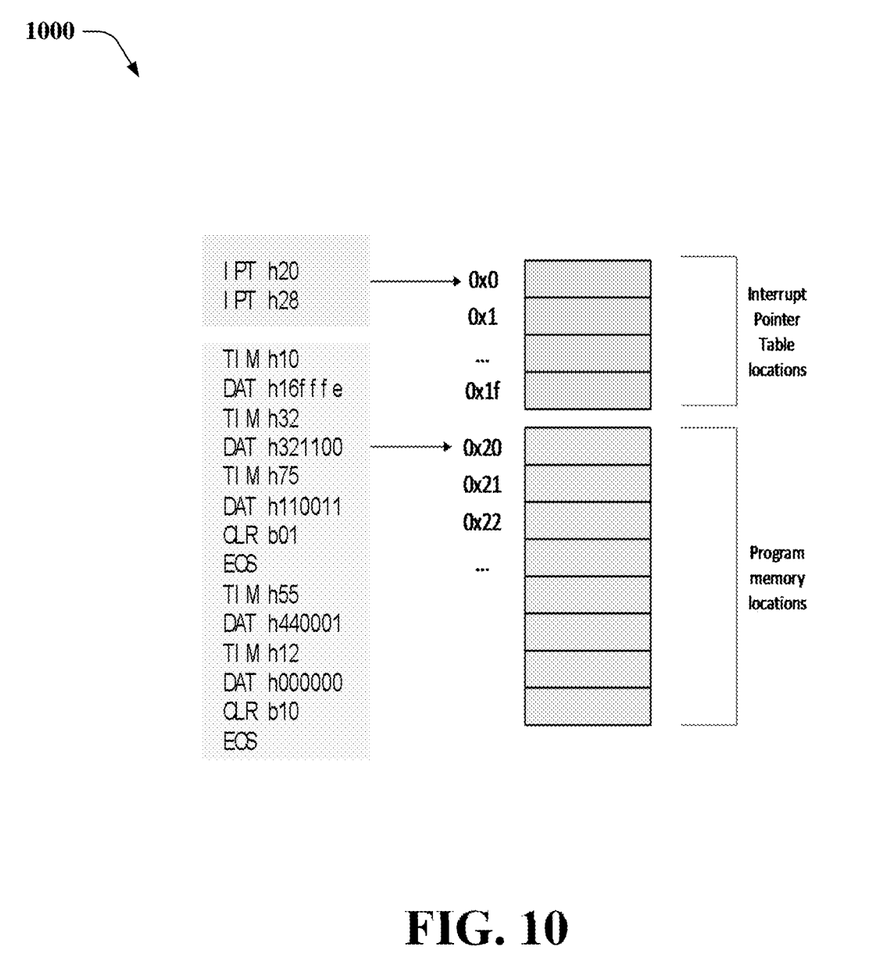
FIG. 10 illustrates a block diagram of an assembly file corresponding to the instruction set for the reconfigurable power sequencer component, in accordance with various example embodiments.

FIG. 9 illustrates a block diagram of an instruction set (900) for generating the assembly file, in accordance with various example embodiments. Further, FIG. 10 illustrates a block diagram of an assembly file (1000) corresponding to the instruction set and corresponding memory locations of interrupt pointer table locations and program memory locations.

Figure 11:
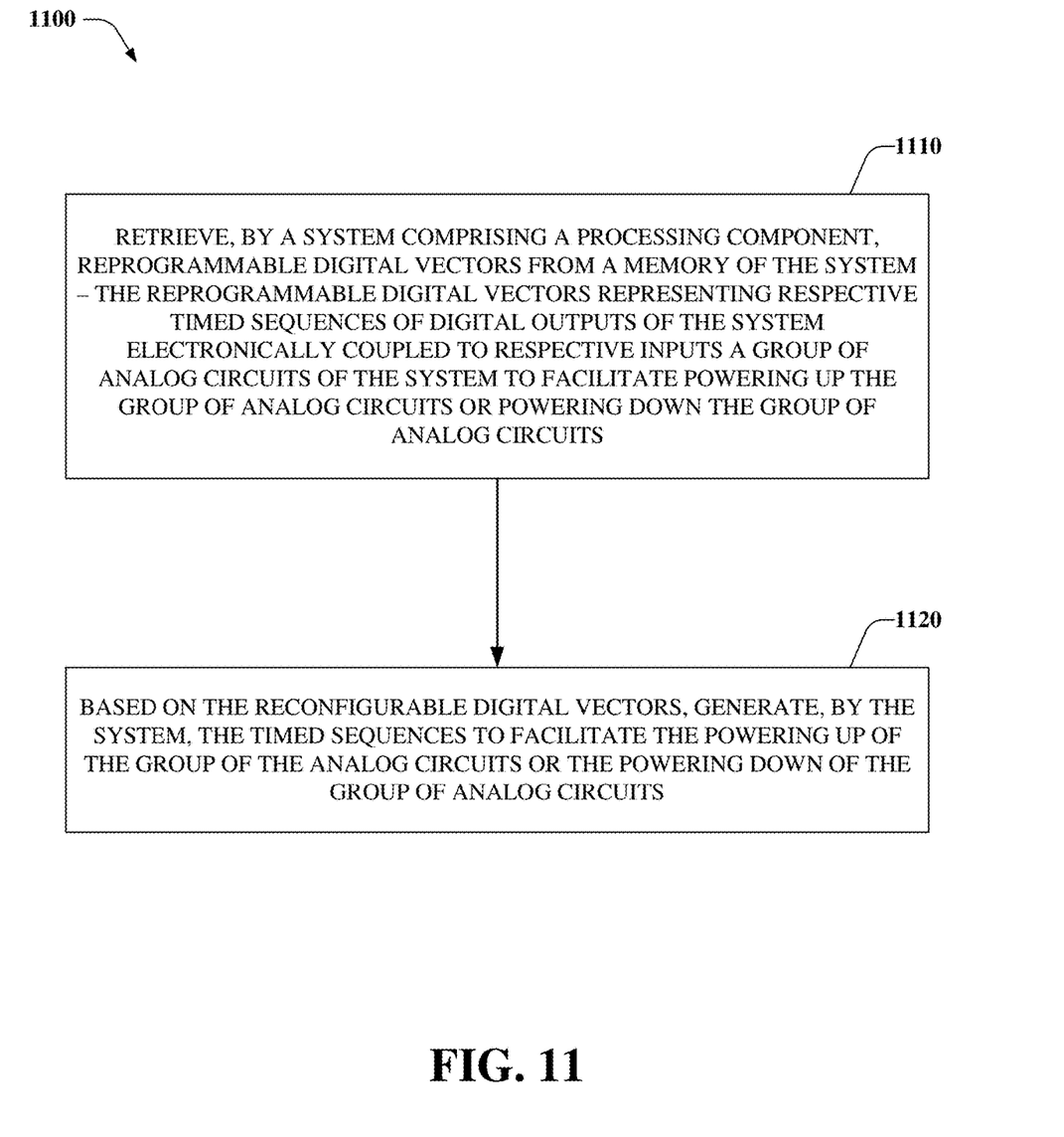
FIG. 11 illustrates a flowchart of a method associated with a reconfigurable power sequencer component, in accordance with various example embodiments.
Figure 12:
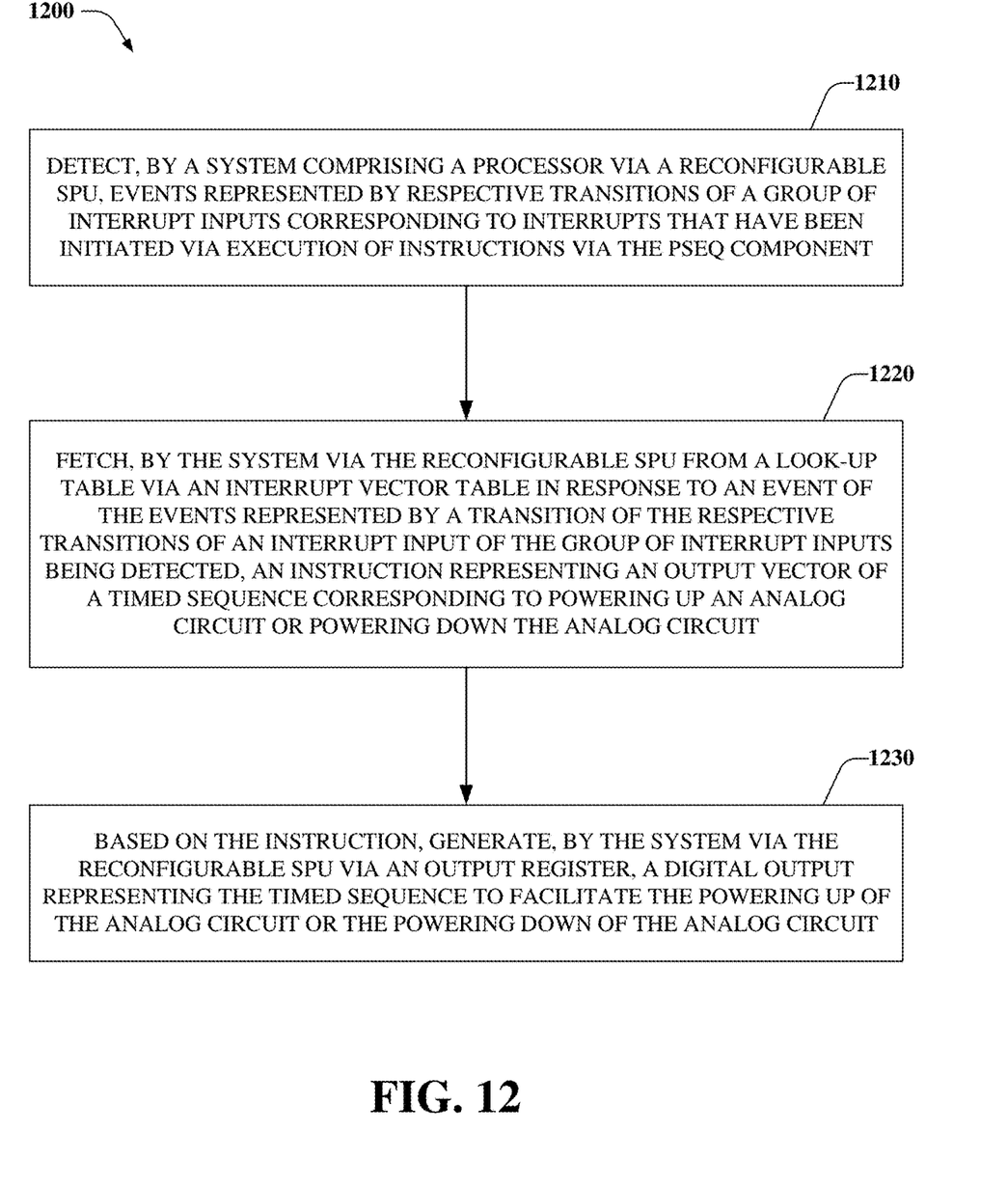
FIG. 12 illustrates a flowchart of a method associated with a reconfigurable sequencer processing unit, in accordance with various example embodiments.

FIGS. 11-12 illustrate methodologies in accordance with the disclosed subject matter. For simplicity of explanation, the methodologies are depicted and described as a series of acts. It is to be understood and appreciated that various embodiments disclosed herein are not limited by the acts illustrated and/or by the order of acts. For example, acts can occur in various orders and/or concurrently, and with other acts not presented or described herein. Furthermore, not all illustrated acts may be required to implement the methodologies in accordance with the disclosed subject matter. In addition, those skilled in the art will understand and appreciate that the methodologies could alternatively be represented as a series of interrelated states via a state diagram or events.

Referring now to FIG. 11, a flowchart (1100) of a method associated with a reconfigurable power sequencer component is illustrated, in accordance with various example embodiments. At 1110, a system (110, 500) comprising a processing component can retrieve reprogrammable digital vectors from a memory, LUT, etc. of the system—the reprogrammable digital vectors representing respective timed sequences of digital outputs of the system electronically coupled to respective inputs of a group of analog circuits, MEMS devices, etc. of the system to facilitate powering up the group of analog circuits, MEMS devices, etc. or powering down the group of analog circuits, MEMS devices, etc.

At 1120, the system can generate, based on the reconfigurable digital vectors, the timed sequences to facilitate the powering up of the group of analog circuits, MEMS devices, etc. or the powering down of the group of analog circuits, MEMS devices, etc.

FIG. 12 illustrates a flowchart (1200) of a method associated with a reconfigurable sequencer processing unit, in accordance with various example embodiments. At 1210, a system (110, 500) comprising a processor can detect, via the reconfigurable sequencer processing unit, events represented by respective transitions of a group of interrupt inputs corresponding to interrupts that have been initiated via execution of instructions via the power sequencer component.

At 1220, the system can fetch, retrieve, etc. via the reconfigurable sequencer processing unit from a LUT via an IVT in response to an event of the events represented by a transition of the respective transitions of an interrupt input of the group of interrupt inputs being detected, an instruction representing an output vector of a timed sequence corresponding to powering up an analog circuit or powering down the analog circuit.

At 1230, the system can generate, based on the instruction via the reconfigurable sequencer processing unit via an output register, a digital output representing the timed sequence to facilitate the powering up of the analog circuit or the powering down of the analog circuit.

As it employed in the subject specification, the term "component" refers to substantially any analog and/or digital based device(s), circuit(s), etc. comprising, e.g., a resistor, a capacitor, a transistor, a diode, an inductor, a memory, a programmable device, e.g., fuse, field programmable gate array (FPGA), complex programmable logic device (CPLD), etc. relevant to performing operations and/or functions of circuit(s), device(s), system(s), etc. disclosed herein. Further, the terms "processing component", "control unit component", "control unit", and "arithmetic logic unit (ALU)" can refer to substantially any computing processing unit or device (e.g., MAC, etc.), comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an ASIC, a digital signal processor (DSP), an FPGA, a programmable logic controller (PLC), a CPLD, a discrete gate or transistor logic, discrete hardware components, an analog circuit, or any combination thereof designed to perform the functions and/or processes described herein. Further, a processor can exploit nano-scale architectures such as, but not limited to, molecular and quantum-dot based transistors, switches and gates, e.g., in order to optimize space usage or enhance performance of mobile devices. A processor can also be implemented as a combination of computing processing units, devices, etc.

In the subject specification, the term "memory", "memory component", "lookup table (LUT)" and substantially any other information storage component relevant to operation and functionality of mixed signal system 110, sensor system 500, etc. and/or devices disclosed herein refer to "memory components," or entities embodied in a "memory," or components comprising the memory. It will be appreciated that the memory can include volatile memory and/or nonvolatile memory. By way of illustration, and not limitation, volatile memory, can include random access memory (RAM), which can act as external cache memory. By way of illustration and not limitation, RAM can include synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and/or Rambus dynamic RAM (RDRAM). In other embodiment(s) nonvolatile memory can include read only memory (ROM), programmable ROM (PROM), electrically programmable ROM (EPROM), electrically erasable ROM (EEPROM), or flash memory. Additionally, the components and/or devices disclosed herein can comprise, without being limited to comprising, these and any other suitable types of memory.

Reference throughout this specification to "one embodiment," or "an embodiment," means that a particular feature, structure, or characteristic described in connection with the embodiment is included in at least one embodiment. Thus, the appearances of the phrase "in one embodiment," or "in an embodiment," in various places throughout this specification are not necessarily all referring to the same embodiment. Furthermore, the particular features, structures, or characteristics may be combined in any suitable manner in one or more embodiments.

Furthermore, to the extent that the terms "includes," "has," "contains," and other similar words are used in either the detailed description or the appended claims, such terms are intended to be inclusive—in a manner similar to the term "comprising" as an open transition word—without precluding any additional or other elements. Moreover, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Aspects of systems, apparatus, devices, processes, and process blocks explained herein can be embodied within hardware, such as an ASIC or the like. Moreover, the order in which some or all of the process blocks appear in each process should not be deemed limiting. Rather, it should be understood by a person of ordinary skill in the art having the benefit of the instant disclosure that some of the process blocks can be executed in a variety of orders not illustrated.

Furthermore, the word "exemplary" and/or "demonstrative" is used herein to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent exemplary structures and techniques known to those of ordinary skill in the art having the benefit of the instant disclosure.

The above description of illustrated embodiments of the subject disclosure is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A system, comprising:
   a mixed-signal component comprising
      a group of analog circuits comprising respective inputs to facilitate a power-up and a power-down of respective portions of the analog circuits; and
   a reconfigurable power sequencer component that
      obtains, from a memory of the system, reprogrammable information representing respective timed sequences of digital outputs electronically coupled to the respective inputs of the group of analog circuits, and
      based on the reprogrammable information, generates the respective timed sequences of the digital outputs to facilitate the power-up and the power-down of the respective portions of the analog circuits.

2. The system of claim 1, wherein the group of analog circuits comprises a sensing device comprising an acoustic sensor, a microphone, an accelerometer, a gyroscope, a pressure sensor, a temperature sensor, a fingerprint sensor, or a magnetometer.

3. The system of claim 1, wherein the respective timed sequences of digital outputs comprise discrete-time quantized functions representing waveforms of the respective digital outputs to facilitate the power-up and the power-down of the respective portions of the analog circuits.

4. The system of claim 1, wherein the reprogrammable information comprises vectors that define respective values of the digital outputs, transitions of the respective values, and respective timings of the transitions.

5. The system of claim 1, wherein the reconfigurable power sequencer component comprises a group of reconfigurable sequencer processing units corresponding to respective analog circuits of the group of analog circuits.

6. The system of claim 5, wherein a reconfigurable sequencer processing unit of the group of reconfigurable sequencer processing units comprises:
   a lookup table that stores a first portion of the reprogrammable information representing a second portion of the respective timed sequences of digital outputs electronically coupled to a third portion of the respective inputs corresponding to an analog circuit of the group of analog circuits.

7. The system of claim 6, wherein the reconfigurable sequencer processing unit further comprises:
   an event decoder component that detects events represented by respective transitions of a group of interrupt inputs corresponding to interrupts that have been initiated via execution of instructions via the power sequencer component; and
   a control unit component that
      fetches, from the lookup table via an interrupt vector table in response to an event of the events represented by a transition of the respective transitions of an interrupt input of the group of interrupt inputs being detected, an instruction from the first portion of the reprogrammable information, wherein the instruction represents an output vector of a timed sequence of the respective timed sequences corresponding to powering up the analog circuit or powering down the analog circuit, and based on the instruction, generates, via an output register, a digital output of the digital outputs representing the timed sequence of the respective timed sequences to facilitate the powering up of the analog circuit or the powering down of the analog circuit.

8. The system of claim 6, further comprising:

a lookup table generation component that obtains, from a file, file information representing the second portion of the respective timed sequences of digital outputs, generates, using the file information, the first portion of the reprogrammable information representing the second portion of the respective timed sequences of digital outputs, and stores the first portion of the reprogrammable information in the lookup table.

9. A method, comprising:

retrieving, by a system comprising a processing component, reconfigurable digital vectors from a memory of the system, wherein the reconfigurable digital vectors represent respective timed sequences of digital outputs of the system electronically coupled to a group of analog circuits of the system to facilitate powering up the group of analog circuits or powering down the group of analog circuits; and based on the reconfigurable digital vectors, generating, by the system, the timed sequences to facilitate the powering up of the group of the analog circuits or the powering down of the group of analog circuits.

10. The method of claim 9, wherein the group of analog circuits comprises at least one of an acoustic sensor, a microphone, an accelerometer, a gyroscope, a pressure sensor, a temperature sensor, a fingerprint sensor, or a magnetometer.

11. The method of claim 9, wherein the reconfigurable digital vectors represent respective sequences of discrete-time quantized functions to facilitate the powering up of the group of analog circuits or the powering down of the group of analog circuits.

12. The method of claim 9, wherein the retrieving of the reconfigurable digital vectors comprises:

in response to a transition of a group of interrupt inputs of the system being detected, generating an event; and in response to the generating of the event, retrieving, from the memory via an interrupt vector table, a reconfigurable digital vector of the reconfigurable digital vectors corresponding to an analog circuit of the group of analog circuits.

13. The method of claim 12, wherein the reconfigurable digital vector represents a timed sequence of the respective timed sequences of a digital output of the digital outputs electronically coupled to the analog circuit, and wherein the timed sequence represents an output value of the digital output, a transition state of the digital output, and a timing value of the transition state representing a period during which the output value is to be maintained on the digital output.

14. The method of claim 13, wherein the generating of the respective timed sequences comprises:

based on the output value, the transition state, and the timing value, generating the digital output to facilitate powering up of the analog circuit or powering down of the analog circuit.

15. The method of claim 9, further comprising:

in response to obtaining information representing the respective timed sequences from a file, generating, by the system based on the information, the reconfigurable digital vectors; and storing, by the system, the reconfigurable digital vectors in the memory of the system.

16. A sensor system, comprising:

a group of micro-electro-mechanical system (MEMS) sensors that generate respective output signals based on respective external stimuli; and a power sequencer component that obtains, from a memory of the system, user-programmable timed sequences of digital signals electronically coupled to respective inputs of the group of MEMS sensors to facilitate control of power states of the group of MEMS sensors, and based on the user-programmable timed sequences, modifies, via the digital signals, the respective inputs of the group of MEMS sensors to facilitate the control of the power states of the group of MEMS sensors.

17. The sensor system of claim 16, wherein the group of MEMS sensors comprises at least one of an acoustic sensor, a microphone, an accelerometer, a gyroscope, a pressure sensor, a temperature sensor, a fingerprint sensor, or a magnetometer.

18. The sensor system of claim 16, wherein the user-programmable timed sequences comprise digital vectors representing respective output values of the digital signals, respective transition states of the digital signals, and timing values of the transition states representing respective periods during which the respective output values are to be maintained on the digital signals.

19. The sensor system of claim 18, further comprising:

a lookup table generation component that obtains information representing the digital vectors from a user-defined file, based on the information, generates the user-programmable timed sequences, and stores the user-programmable timed sequences in the memory.

20. The sensor system of claim 16, wherein the power sequencer component comprises a von Neumann architecture for facilitating the control of the power states of the group of MEMS sensors.

* * * * *